United States Patent [19]

Bouillot et al.

[11] Patent Number: 4,855,948

[45] Date of Patent: Aug. 8, 1989

[54] BYPASS BOOSTER MECHANISMS FOR THE LINE SCANNERS OF A COMMUNICATION CONTROLLER

[75] Inventors: Michel Bouillot, Nice; Jean-Louis J. Calvignac, LaGaude; Jean-Marie L. Munier, Cagnes sur Mer, all of France

[73] Assignee: International Business Machines Corporation, Armonk, N.Y.

[21] Appl. No.: 107,432

[22] Filed: Oct. 8, 1987

[51] Int. Cl.$^4$ ............................................... G06F 3/00
[52] U.S. Cl. ..................................... 364/900; 364/929
[58] Field of Search ... 364/200 MS File, 900 MS File

[56] References Cited

U.S. PATENT DOCUMENTS

| | | | |
|---|---|---|---|
| 4,261,035 | 4/1981 | Raymond | 364/200 |
| 4,336,588 | 6/1982 | Vernon et al. | 364/200 |
| 4,491,913 | 1/1985 | Calvignac et al. | 364/200 |
| 4,504,901 | 3/1985 | Calvignac et al. | 364/200 |
| 4,809,155 | 2/1989 | Costes et al. | 364/200 |

FOREIGN PATENT DOCUMENTS 2070896 9/1981 United Kingdom .

OTHER PUBLICATIONS

Increase Datacomm System Performance while Simplifying Design with the BOCC (Bit-Oriented Communication Coprocessor) R. J. Jigour, Electro/85 and Mini/Micro Northeast Conference Record, Apr. 23-25, 1985, pp. 1-8, New York.

Primary Examiner—Eddie P. Chan
Assistant Examiner—Kevin A. Kriess
Attorney, Agent, or Firm—Edward H. Duffield

[57] ABSTRACT

The system of the invention is used in a communication controller comprising a central control unit connected to at least one line adapter through a bus, wherein the line adapter may not be attached through its line interface to communication lines working at a speed higher than v, this mechanism allowing the adapter to be connected to one communication line onto which information is transported in frames at a high speed HS which is higher than v. It comprises a receive mechanism and a transmit mechanism building a bypass booster 1. The receive mechanism constructs from the received bit stream on high speed line 6, a short frame only comprising the heading portions of the frames, said short frame being handled by the line scanner 2 and the complete frame being handled separately in bypass booster 1. The transmit mechanism simulates the transmission from the system bus 5 of a short frame which is handled by the line scanner and the complete frame is handled in the bypass booster, from which the complete frame is sent on the high speed line 6.

10 Claims, 10 Drawing Sheets

TRANSMIT PORTION
HS LINE INTERFACE

| FIG. 2A | FIG. 2B |
| --- | --- |
| FIG. 2C | FIG. 2D |

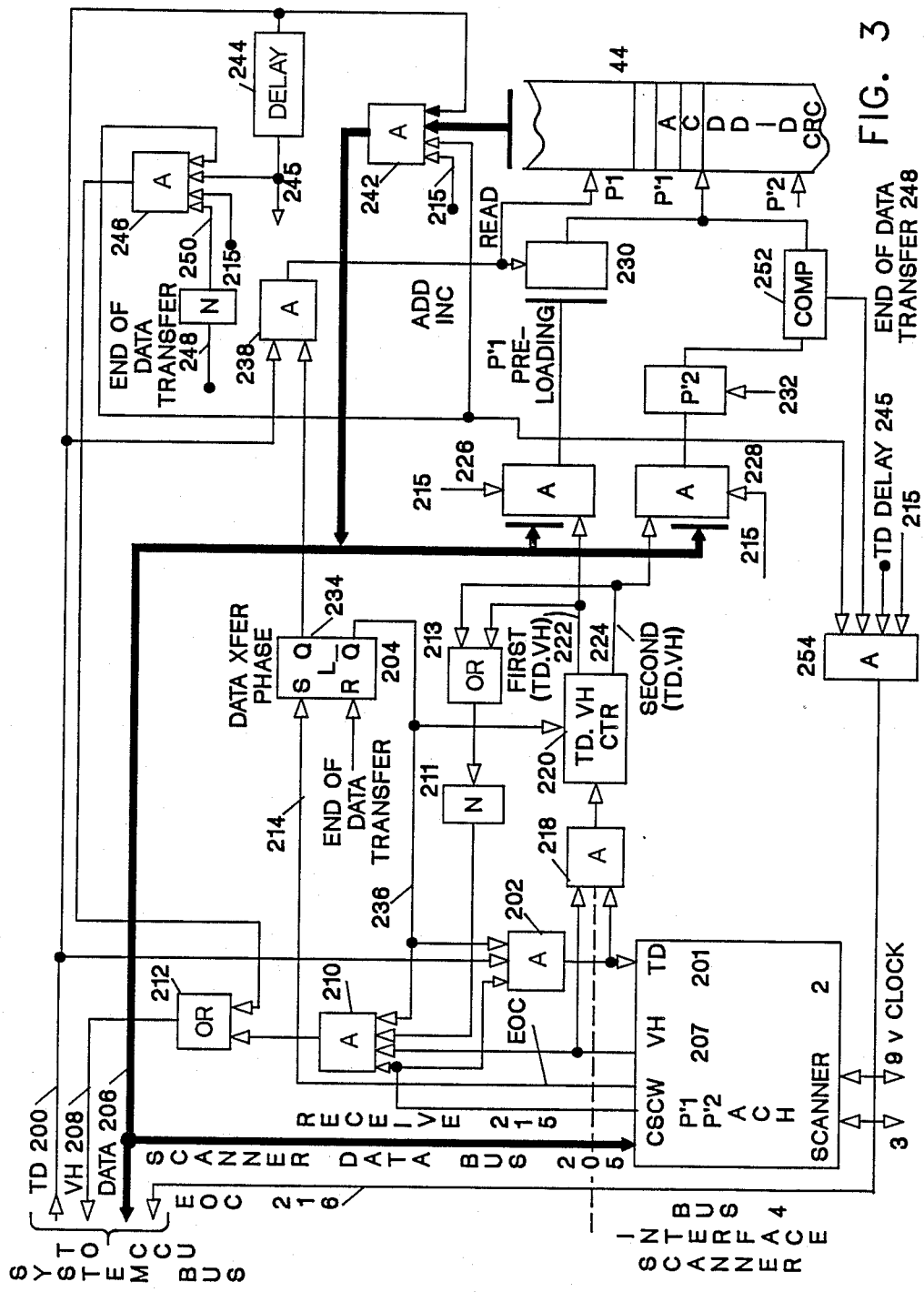

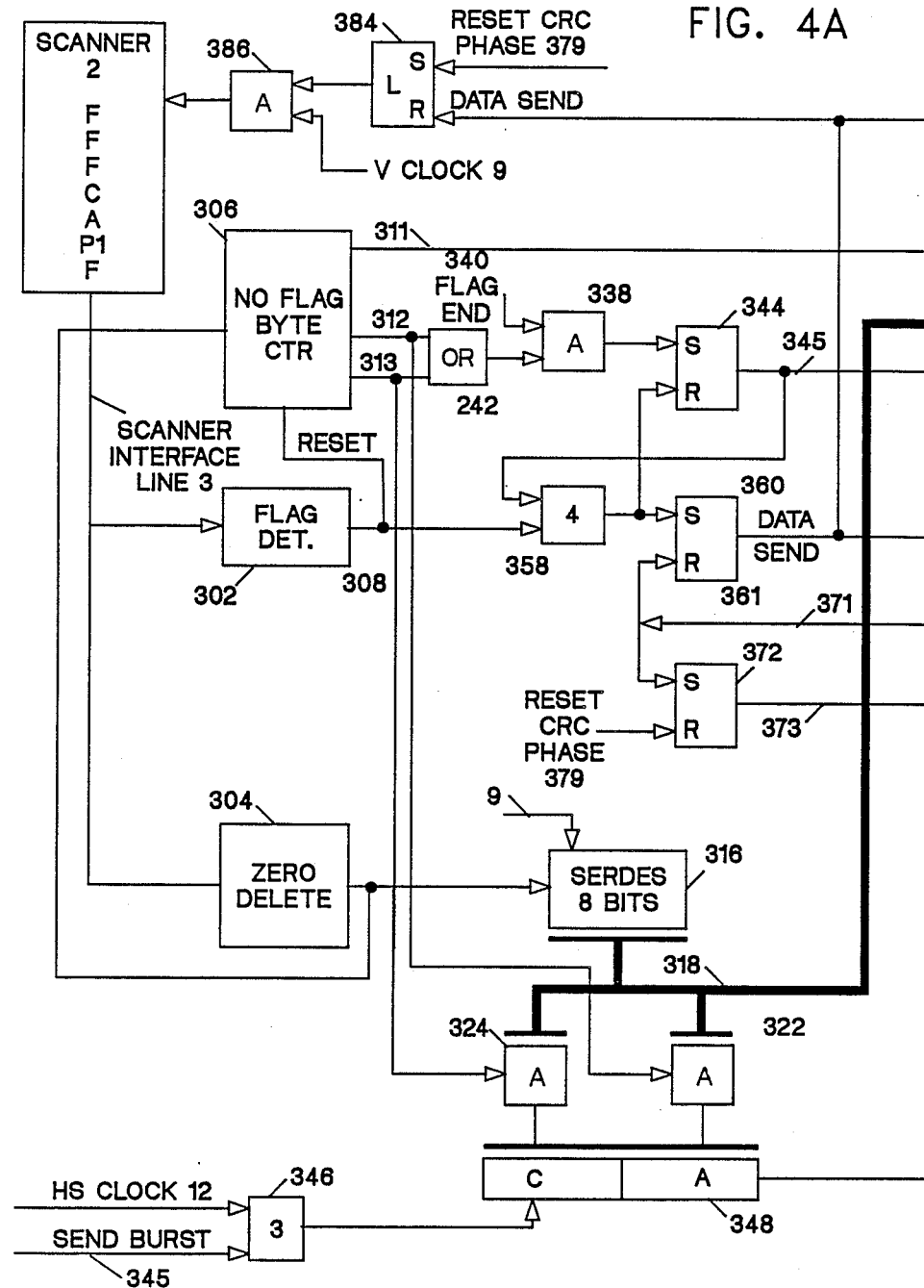

BYPASS BOOSTER MECHANISMS FOR THE LINE SCANNERS OF A COMMUNICATION CONTROLLER

DESCRIPTION OF THE INVENTION

1. Field of the Invention

This invention relates to receive and transmit mechanisms allowing a microcoded line scanner of a communication controller to be used at a speed which is much higher than its actual speed, without any change of the hardware internal structure and with minor changes in the microcode.

2. Background Art

The microcoded line scanners of the IBM 3725 communication controllers may be attached to one or several communication lines depending upon the line speeds. For the present time, only one line operating at a maximum speed of 256 kilobits per second may be connected to such a line scanner. Consequently, the attachment of very high speed communication lines to an IBM 3725 communication controller requires either the implementation of new line scanners or the use of a plurality of line scanners to accommodate only one high speed line such as described in the article published in the IBM Technical Disclosure Bulletin Vol. No. 26 Feb. 9, 1984 pages 4647 and 4648.

The first solution does not make it possible to attach already installed communication controllers to high speed lines, without high development costs and the second solution requires too much hardware.

OBJECT OF THE INVENTION

An object of the present invention is to provide an improved receive mechanism to be connected to the existing line scanners of a communication controller to allow the bit stream from a high speed line to be received by the communication controller.

A further object of the present invention is to provide an improved transmit mechanism to be connected to the existing line scanners of a communication controller which allows the bit stream from the controller to be sent on a high speed line.

Another object of the present invention is to provide an improved system comprising the receive and transmit mechanisms to be connected to the existing line scanners of a communication controller to convert them into high speed line scanners.

Yet another object of the present invention in such a system, is the improved implementation which does not require any knowledge of the scanner hardware and microcode.

SUMMARY OF THE INVENTION

The mechanisms and system according to the present invention are to be used in a communication controller comprising a central control unit connected to at least one line adapter through a bus, wherein the line adapter may not be attached through its interface line, to communication lines working at a speed higher than v. The present invention allows the adapter to be connected to one communication line onto which information is transported in frames at a high speed HS which is higher than v.

The improved receive mechanism comprises:
line interface receive means (FIG. 2) comprising:
  receiving means for receiving the frames at the line speed HS,
  receive storing means, into which the frame bytes received from the receiving means are stored at addresses delimited by first and second write pointers saved in first and second write register means,
  means responsive to the received frames on the high speed line for constructing short frames therefrom, said short frames comprising a fixed number of frame bytes and the first and second write pointer values indicating where the frame bytes are stored in the receive storing means, and
  means for sending to the scanner at the scanner speed v on the scanner interface line, the so constructed frames,
bus interface receive means (FIG. 3) comprising:
  means which are responsive to a receive command from the central control unit for outputting the short constructed frames from the scanner and sending the fixed number of the frame bytes to the central control unit through the bus,
  means which prevent the write pointer values comprised in the short frames and which are outputted from the scanner from being sent to the central control unit,
  means for providing the write pointer values to first and second read register means, and
  means for sequentially reading the receive storing means content at the addresses defined by the first and second read pointer register means content and sending the frame bytes exceeding the fixed number of bytes from the receive storing means to the central control unit.

The improved transmit mechanism comprises:
bus interface transmit means (FIG. 5) comprising:
  means for initiating a transmit operation from the central control unit,
  transmit storing means into which the frame bytes which are sent from the central control unit to be transmitted on the high speed line are stored into positions delimited by first and second write pointers, the address of the last position into which a byte has been stored being stored into a current pointer register means,
  means for simulating the transmission to the line scanner through its bus interface of a short frame comprising at least the first pointer value which is equal to the content of the current pointer register means when the transmit operation is initiated, and
  means for receiving from the central control unit when the transmit operation is initiated, the count of frame bytes which are to be sent on the high speed line, and
line interface transmit means (FIG. 4) comprising:
  transmitting means which are responsive to the short simulated frames which are sent on the scanner line interface to cause at the beginning of each frame the first pointer value of the simulated short frame to be loaded into a first read pointer register means, which provides on its output bus the transmit storing means address,
  means which causes the read pointer register means content to be incremented, and a read control signal to be provided to the transmit storing means so as to read sequentially at the high speed the frame bytes from the transmit storing means at the address defined by the read pointer register means (326) until the byte count is reached and transmits them serially on the high speed line.

BRIEF DESCRIPTION OF THE DRAWINGS

FIGS. 2A-2D show the receive part of the line interface of the bypass booster.

FIG. 3 shows the receive part of the system bus interface of the bypass booster.

FIGS. 4A and 4B are assembled.

FIGS. 4A and 4B shows the transmit part of the line interface of the bypass booster.

FIG. 5 shows how

FIGS. 5A and 5B shows the transmit part of the system bus interface of the bypass booster.

DETAILED DESCRIPTION OF THE INVENTION

Figure 1:
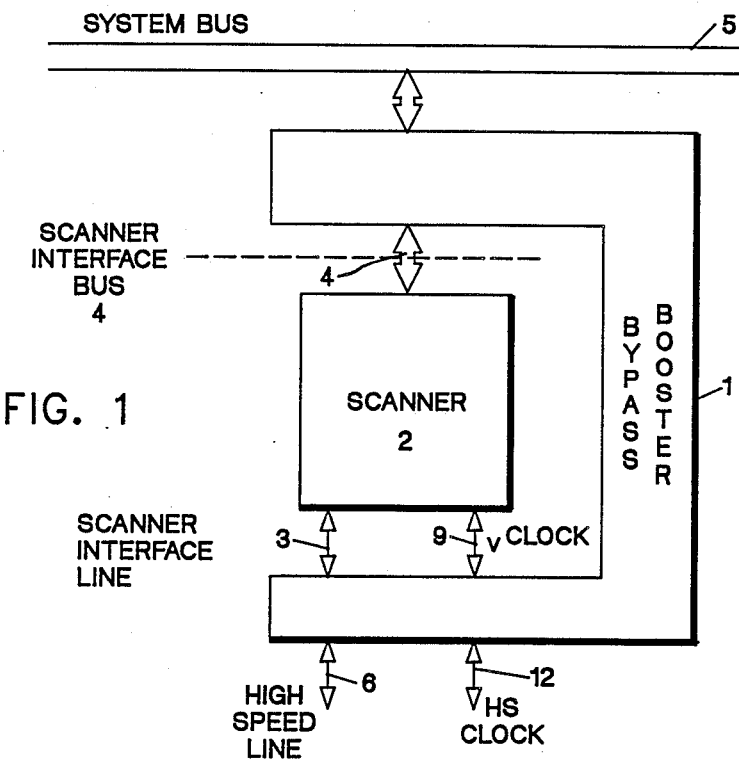
FIG. 1 shows the general arrangement of the bypass booster hardware with respect to the scanner interfaces.

As schematically shown in FIG. 1, the device according to the present invention is a hardware bypass booster 1 which is connected to the existing line scanner 2 of a communication controller, by its two interfaces:

Standard CCITT line interface 3

System bus interface 4.

In the following description, it will be assumed that the communication controller is of the IBM 3725 type.

The bypass booster 1 receives and sends the information to and from a high speed line 6 at a speed HS which is higher than the maximum operation speed v of the line scanner 2.

In accordance with the present invention, the bypass booster hardware simulates the reception and transmission of short frames at v speed, on scanner interface line 3, these short frames only comprising the heading part with inserted zeroes of the actual frames i.e. the flag F, address A, control C and a short data portion which may comprise the header field and potentially some data, said short frames being handled by the scanner in the conventional way.

The data portion is handled separately by the bypass booster hardware, as will be explained later on in reference to the drawings.

Figure 2A:
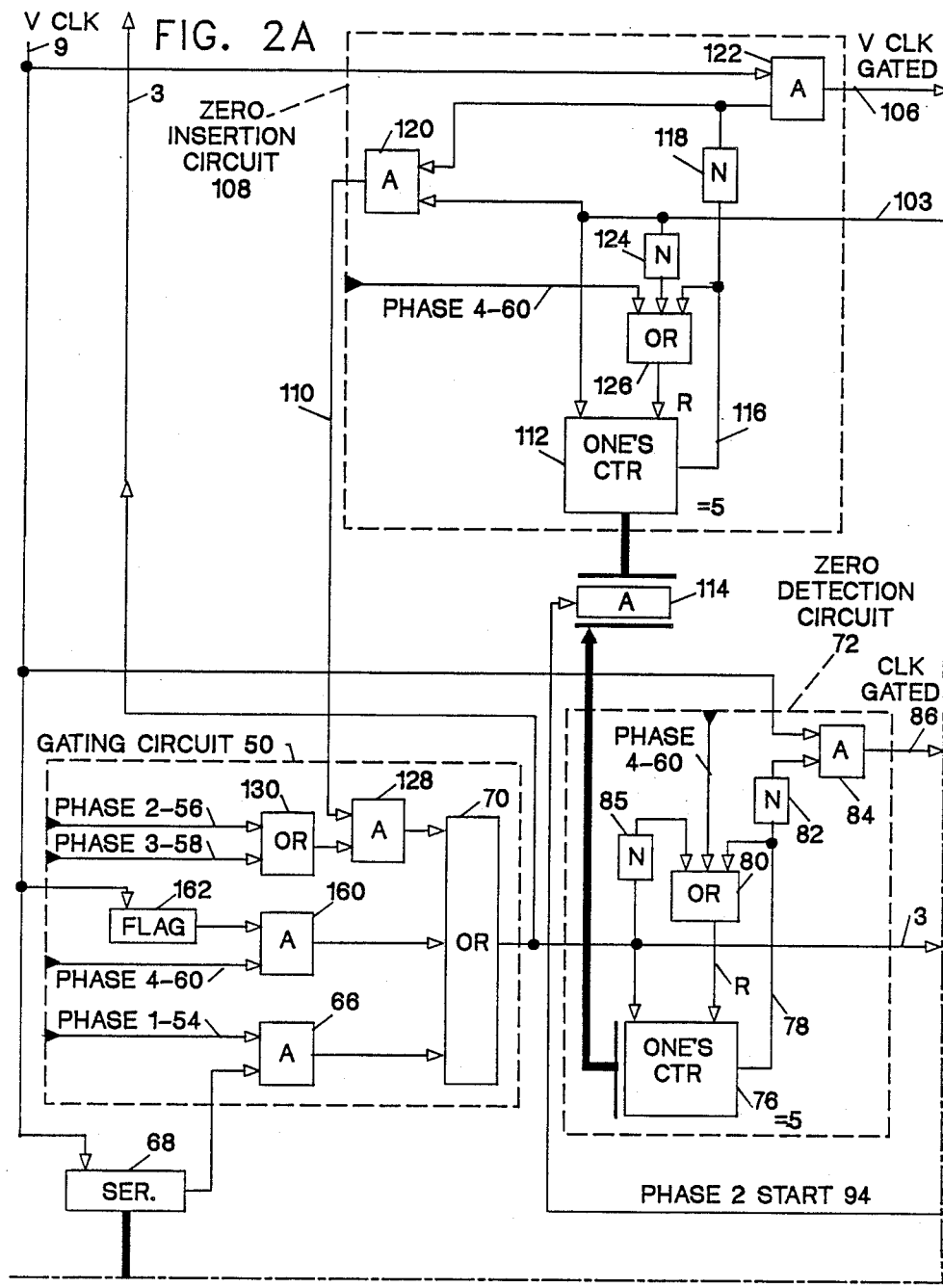
FIGS. 2A-2D are assembled.
Figure 2B:
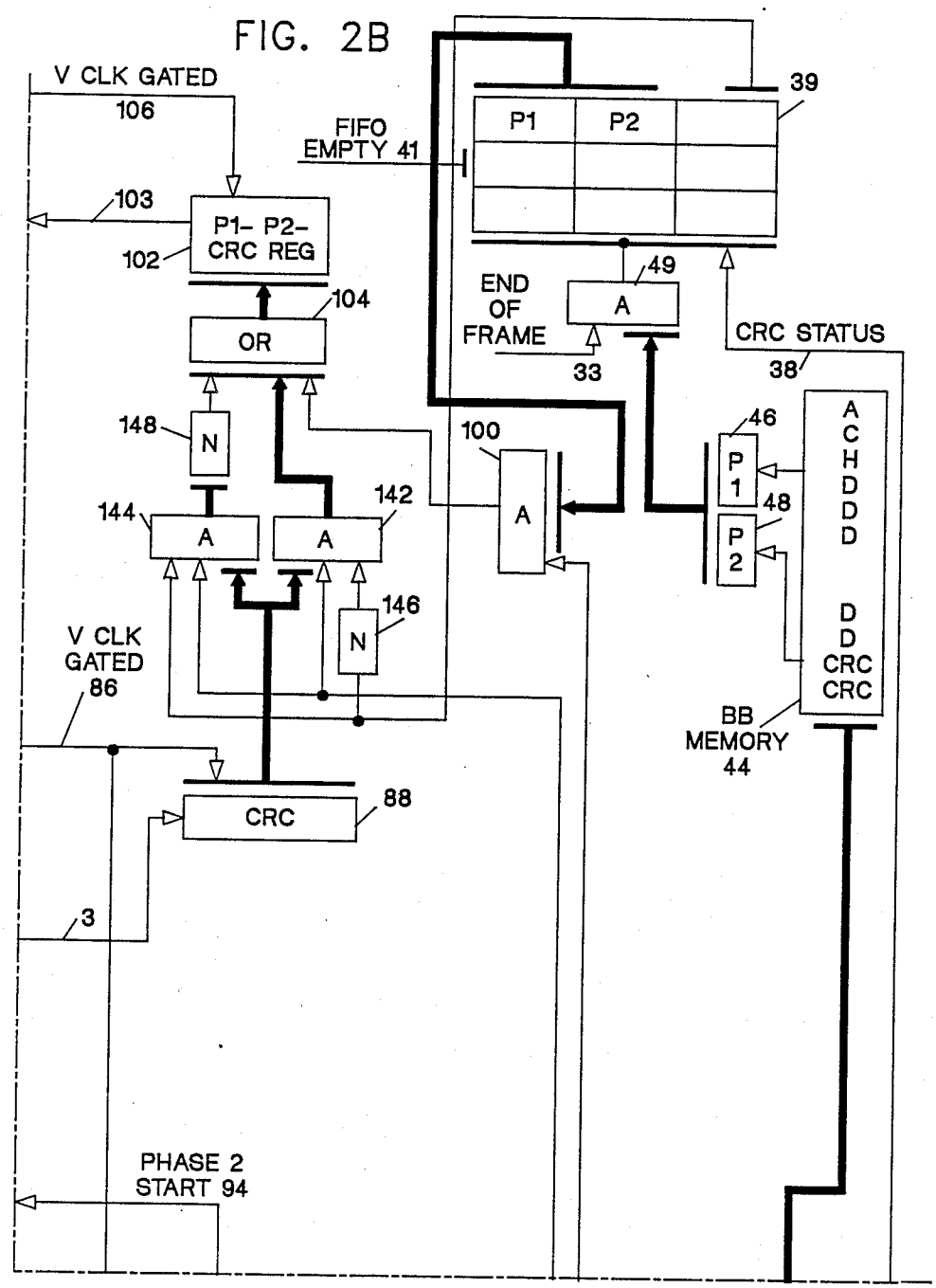
Figure 2C:
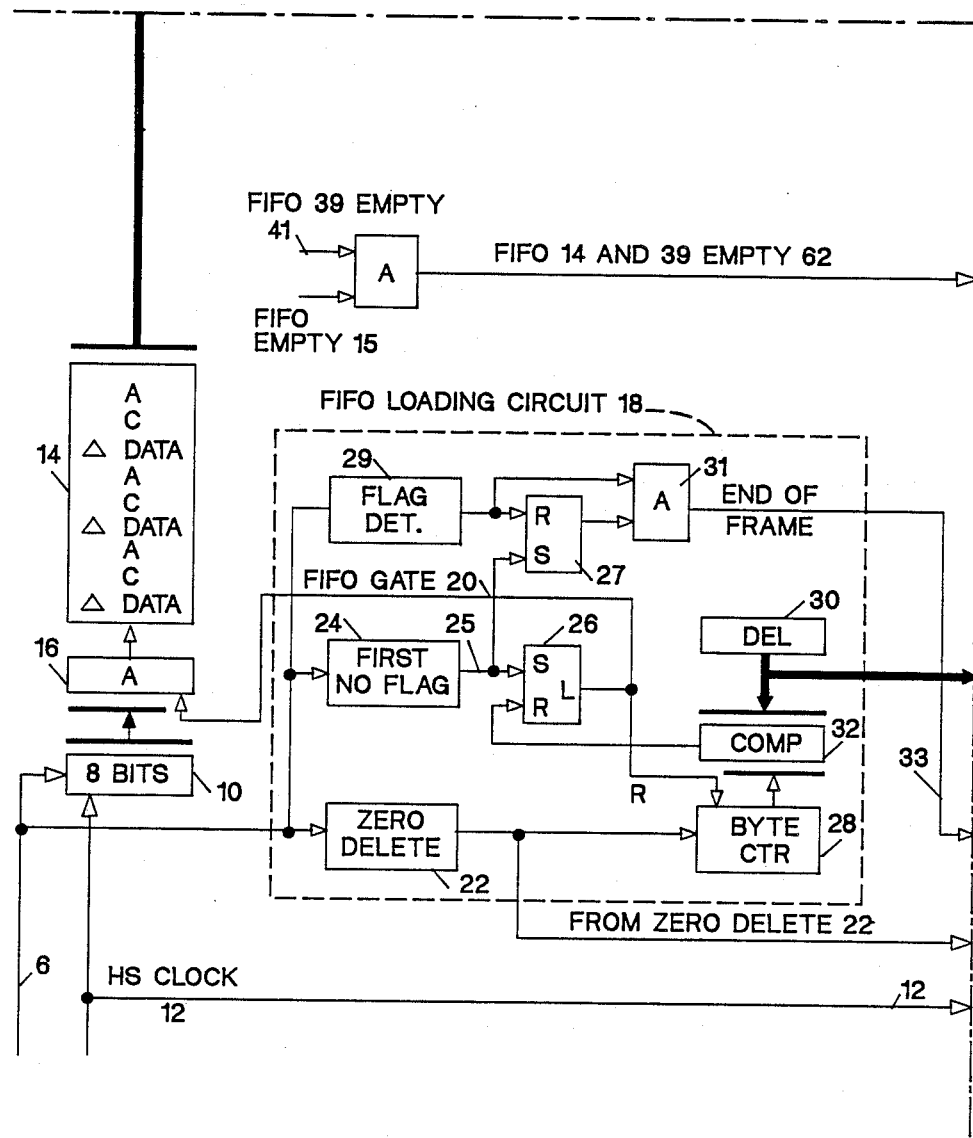
Figures 2, 2D:
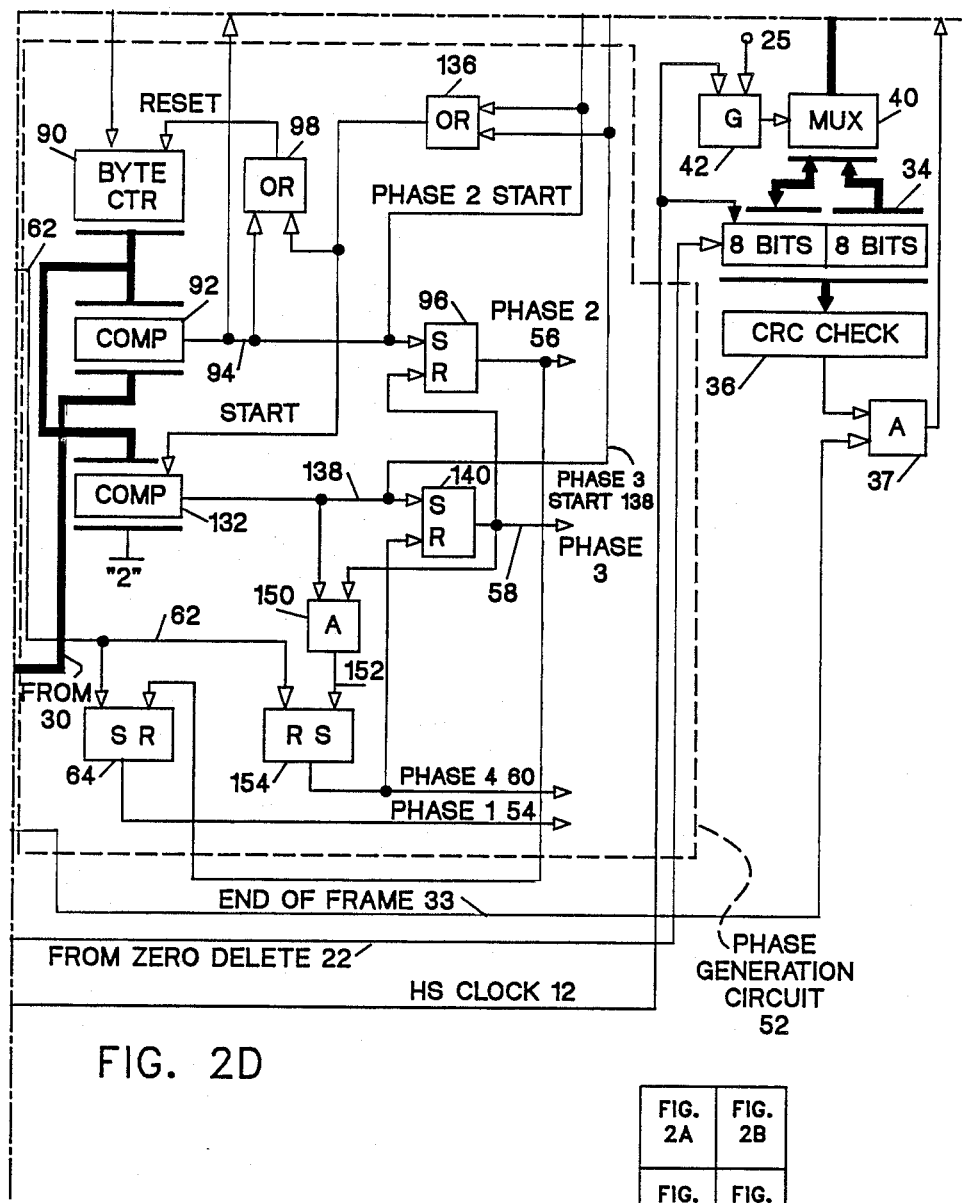
FIG. 2 shows how
Figure 4B:
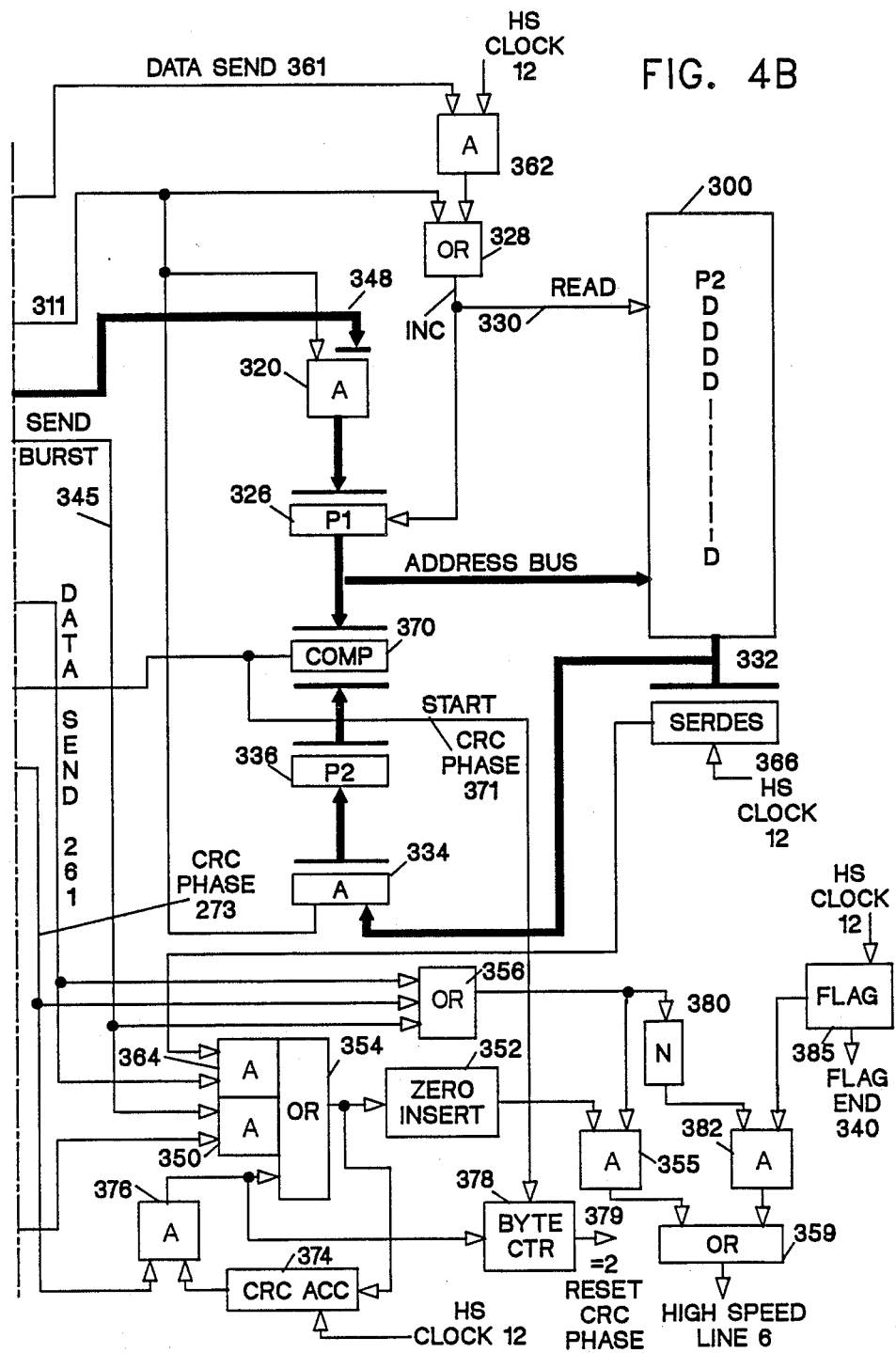

FIG. 2 shows the receive part of the bypass booster which allows the frames of the SDLC or HDLC types to be received from the high speed line 6 under control of a HS clock on line 12 and the simulated short frames to be sent to the scanner on interface 3 under the control of a v clock on line 9. FIG. 3 shows the receive part of the bypass booster which allows the complete received frames to be sent to the central control unit of the communication controller through the system bus 5 (FIG. 1).

As shown in FIGS. 2A and 2B, the SDLC frames are received from high speed line 6 at speed HS. They are deserialized into 8-bit bytes in shift register 10 under control of the HS clock signal provided on line 12. These received frames are comprised of the conventional flag F, address A, control C and data bytes. Only the heading part of the frames comprised of X bits including A, C fields and potentially some data bytes are the data to be stored into first in-first out memory FIFO 14. These X bits comprise the zeroes which are inserted in the bit stream according to the SDLC or HDLC protocols and corresponding to an integer number DEL of actual bytes without zeroes inserted. To do this the content of deserializer 10 is stored into memory 14 through AND gate assembly 16 which is conditioned by a FIFO GATE signal generated by FIFO LOADING CONTROL CIRCUIT 18 on line 20. This signal is active from the first non-flag byte until the fixed number DEL of bytes are received.

Circuit 18 comprises a zero deletion circuit 22, which removes the zeroes which follow five consecutive ones in the received frames to retrieve the actual frames according to the SDLC or HDLC protocols. Circuit 24 detects the first no flag byte in the received frame. Upon detection of this byte, the active signal on its output line 25 sets latch 26. The output signal of latch 26 resets byte counter 28, which then starts counting the bytes of the received frames from the end of the flag at the beginning of the frame. Register 30 contains the DEL value. Comparator 32 compares the content of counter 28 with the DEL value and provides an active signal on its output line which resets latch 26 when an equality is detected. Thus latch 26 provides an active signal on its output line 20 which conditions AND gate assembly 16 to load the X frame bits corresponding to the DEL bytes, into FIFO memory 14.

The signal on line 25 sets latch 27 which provides an active signal at the beginning of the frames. Flag detect circuit 29 detects the flags in the received frames and upon detection of a flag, provides an active output signal which resets latch 27. The output signals from circuit 29 and from latch 27 are provided to AND gate 31, which provides an active signal on its output line 33 at the end of the frames.

The received frames after zero deletion in circuit 22 are provided to 16-bit deserializer 34 under control of HS clock signal on line 12. The 16-bit deserializer content is provided to CRC (cyclic redundancy code) check circuit 36 which checks whether the received CRC two-bytes are correct or not.

When an error is detected, an active signal is generated by circuit 36. This signal is provided to AND gate 37 which is conditioned at the end of the frame through active signal on line 33. The output signal of AND gate 37 i.e. the CRC status is loaded into first in - first out FIFO memory 39.

The content of deserializer 34 is provided to multiplex circuit 40 which is operated through gating arrangement 42 to alternatively store the byte assembled in the right part and in the left part of deserializer 34 into bypass booster memory 44. Gating arrangement 42 generates the gating signals to circuit 40 from the HS clock signal and from the signal on line 25 at the output of circuit 24 which is active at the beginning of the received frames.

The frames are stored into memory 44 from a first free position indicated by a pointer P1. The position of the last frame byte is indicated by a pointer P2. The current values of the P1 and P2 pointers are stored into WRITE POINTER registers 46 and 48, respectively. When a complete frame is received, the register contents are stored into FIFO memory 39 in correspondence with the CRC states through AND gate 49, which is conditioned by the END of FRAME signal on line 33. Thus each position of the FIFO memory 39 contains the pointers values P1 and P2 and the CRC status of each sequentially received frames.

One of the functions of the bypass booster is to send the data bytes to the CCU through the system bus from memory 44 as will be described in reference to FIG. 3.

Scanner 2 only receives through its interface 3 a reconstructed frames with inserted zeroes comprising the first DEL bytes plus the pointer values indicating where the corresponding data bytes are stored in memory 44 and simulated CRC bytes. These reconstructed frames are generated by gating circuit 50 which operates under control of phase generation circuit 52.

Circuit 52 provides, on output line 54, a PHASE 1 signal which is active to control the sending on interface 3 at the output of gating circuit 50 of the X bits of each frame stored in FIFO memory 14. Circuit 52 also provides, on output line 56, a PHASE 2 signal which is active to control the sending on interface 3 of P1 and P2 values relative to each frame. Circuit 52 further provides, on output line 58, a PHASE 3 signal which is active to control the sending of CRC bytes relative to each frame on interface 3. Circuit 52 also provides, on output line 60, a signal which is active t control the sending of flags on interface 3.

When FIFO memory 14 and FIFO memory 39 are not empty, an active signal is generated on line 62 at the output of AND gate 63 which sets latch 64 in circuit 52, which thus generates the active PHASE 1 signal. This signal is provided to AND gate 66 in circuit 50 which is thus conditioned so that the bytes which are outputted from memory 14 and serialized by means of serializer 68 are provided to the scanner interface at the output line 3 of gating circuit 50 through OR gate 70.

The bits at the output of circuit 50 are provided to zero deletion circuit 72, which deletes the zeroes following five consecutive ones.

Circuit 72 comprises one's counter 76 which counts the bits on interface line 3 and provides an active signal on output line 78 when it reaches "five". The active signal on line 78 resets counter 76 through OR circuit 80. The output signal from counter 76 is inverted in inverter 82, the output line of which is provided to AND gate 84. AND gate 84 receives the v clock signal from line 9, and gates on its output line 86, the v clock signal which is inhibited during the period when a zero is to be deleted.

The bit stream on interface line 3 is inverted in inverter 85, the output line of which is provided to OR circuit 80 to reset counter 76 each time a zero is received on line 3. Furthermore PHASE 4 line 60 is provided to OR circuit 80 to reset counter 76 during the flag sending periods.

The bit stream on interface line 3 and the CLOCK gated signal on line 86 are provided to CRC accumulating circuit 88 and the clock gated signal on line 86 is also provided to byte counter 90 in circuit 52.

Byte counter 90 counts the clock pulses at the output 86 of AND gate 84 and thus counts the actual received bytes. The content of counter 90 is compared to the DEL value, provided by register 30, in comparator 92 which generates an active signal on its output line 94 when an equality is detected. The active signal on line 94 sets latch 96 and is indicative of the PHASE 2 start. The signal on output line 56 of latch 96 is active during the phase 2 duration. The active signal on line 56 resets PHASE 1 latch 64.

The output signal on line 94 resets counter 90 through OR gate 98.

Active PHASE 2 START signal on line 94 conditions AND gate assembly 100, which at that time transfers the P1 and P2 pointer values read from FIFO memory 39 through OR gate 104.

The content of register 102 is shifted under control of the v clock signal on line 106 and is provided to zero insertion circuit 108.

The function of circuit 108 is to insert zeroes after five ones to provide on output line 110 the P1 and P2 values with zeroes inserted when necessary, to allow these values to be transmitted on interface 3 as if they were received from the line 6.

To do this, at the end of phase 2, the content of one's counter 76 in circuit 72 is loaded into one counter 112 through AND gate 114. Gate 114 is conditioned by the active signal on line 94 to allow the one's, which were counted during the phase 1 period, to be taken into account during the phase 2 period.

Counter 112 is reset through a signal on the output line of OR gate 126 which is active when the counter content reaches "five" or when a zero is received on line 103 or during the flag sending period. Thus, the input lines of OR gate 126 are the output line of inverter 124, which inverts the bit stream on line 103, line 60 and line 116. The output signal from counter 112 on line 116 is provided to inverter 118. Thus, when the counter content is different from five, AND gates 120 and 122 are conditioned and the bits which are outputted from register 102 under control of the gated v clock signal on line 106 are provided on line 110. When signal on line 116 is active, counter 112 is reset. Thus, during the period where a zero is to be inserted, the v clock signal is inhibited through AND gate 122 and a zero is inserted in the bit stream on line 110. The output line 110 of AND gate 120 is provided to one input of AND gate 128 which is conditioned during the phase 2 through OR gate 130. The output line of AND gate 128 is provided to OR gate 70 which provides on its output line 3, the P1 and P2 values with inserted zeroes during the phase 2.

During this phase 2, zero deletion circuit 72 provides on its output line the P1 and P2 values to CRC accumulating circuit 88 and byte counter 90 restarts counting the clock pulses on line 86. The counter content is provided to comparator 132 which compares the counter value with "two" when the signal on START line 134 at the output of OR gate 136 is active. When an equality is detected, comparator 132 generates an active output signal on line 138 which is indicative of the beginning of phase 3.

This signal is provided to one input of OR gate 136 and causes byte counter 90 to be reset. This signal sets latch 140 which thus provides an active signal on its PHASE 3 output line 58. The active PHASE 3 signal resets PHASE 2 latch 96.

PHASE 3 START signal on line 138 conditions AND gate assemblies 142 and 144. The CRC status relative to the frame read from FIFO memory 39 on line 147 is inverted in inverter 146. Thus when no CRC error is detected, AND gate assembly 142 is conditioned to transfer the content of CRC accumulator 88 into register 102 through OR gate assembly 104. When a CRC error is detected, AND gate assembly 144 is conditioned to transfer the CRC accumulator value to inverter assembly 148. Thus the inverted CRC value is transferred into register 102 through OR gate 104. This allows simulation of erroneous CRC in case a CRC error is detected by circuit 36 so that the scanner will be aware that the received complete frame is in error.

The CRC value, or inverted CRC value as the case may be, in register 102 is provided on line 110 with inserted zeroes during the phase 3 duration. This is to be provided on interface 3 through AND gate 128 and OR gate 70.

Active PHASE 3 signal on line 58 conditions AND gate 150 in circuit 52, which thus provides an active signal on its output line 152 when comparator 132 detects an equality with "two" during the phase 3. This signal sets latch 154 which provides on its output line 60 the active PHASE 4 signal. This signal resets PHASE 3 latch 140. Latch 154 is reset by the FIFO NOT EMPTY signal on line 62.

During phase 4, AND gate 160 in circuit 50 is conditioned and provides the flag configuration stored in shift register 162 to interface 3 through OR gate 70.

When the simulated frame has been sent to scanner 2 through interface 3, if the FIFO memories 14 and 39 are found not empty which means that a new frame has been received, latch 154 is reset and latch 64 is set to initiate a new phase 1.

If the FIFO memories 14 and 39 are found empty, latch 154 remains set, and flags are sent to scanner 2 until FIFO memories 14 and 39 are found not empty.

Briefly, gating circuit 50 controls the transmission on interface line 3, of the simulated short frames at the scanner speed v. To do this, upon detection of the first no-flag byte, if any, FIFO LOADING CONTROL circuit 18, causes the fixed number DEL of actual bytes, (i.e. the number X of bits comprising the inserted zeroes according to the SDLC protocol, corresponding to DEL actual bytes), to be stored in FIFO memory 14. Then, if the FIFO memory is found not empty, meaning that at least a significant frame has been received, gating circuit 50 causes the memory content to be sent on interface 3, (PHASE 1). The complete frames, except the flags are stored into memory 44 at the line high speed HS at memory positions delimited by two pointers P1 and P2. During the second phase PHASE 2, gating circuit 50 causes the pointers to be sent on interface 3 with inserted zeroes after the X frame bits. The two CRC bytes corresponding to the X bits and the pointers with inserted zeroes are calculated through circuits 72 and 88, and the so generated CRC bytes or the inverted CRC bytes (if a CRC error has been detected by circuit 36 in the complete frame) are sent by circuit 50 on interface 3 during the third phase (PHASE 3). Then the fourth phase is entered and if the FIFO memory 14 is not empty, gating circuit 50 cause a flag to be sent on interface 3 and a new phase 1 to be entered. If FIFO memory is empty, flags are continuously sent on interface 3 by gating circuit until the FIFO memory is found not empty.

It will now be described in reference to FIG. 3, how the complete received frames are sent to the central control unit on the CCU system bus.

The short simulated frames are handled by scanner 2 in a conventional way.

It is assumed that the complete frames have to be sent to the CCU memory in cycle steal mode. First the cycle steal operation is initiated by the central control unit which sends a receive command using the cycle steal initiation protocol (CYCLE STEAL REQUEST/CYCLE STEAL GRANT) as usual. Then the scanner 2 sends the cycle steal control word CSCW. This will not be described in detail since these procedures are conventional. The scanner activates a RECEIVE control line 215, which controls the operation of the bypass booster hardware. This line is provided to the AND gates as shown in FIG. 3.

Then the conventional exchange of tags on the control lines of the bus is initiated. The CCU sends the TD tag on line 200. This tag is provided to the scanner 2, through AND gate 202 which is conditioned at that time, since latch 204 is reset. The scanner, upon reception of this first tag, sends the pointer value P'1 on the scanner bus 205. Pointer value P'1 is equal to P1+2, to point to the data part in bypass booster memory 44. The two added bytes appended to the pointer value p'1 are 2 bytes corresponding to the heading portion of the frame A and C. Then after a delay, the scanner sends the VH tag (valid data) on line 207. The transfer of this tag to the VH CCU line 208 is inhibited through AND gate 210 by means of the signal at the output line of inverter 211. Then, since TD tag is still raised, the scanner causes the pointer value P'2=P2−2, pointing to the end of the data portion in the memory 44, to be sent on scanner bus 205.

Normal TD, VH lines 201 and 207 attached to the scanner 2 are provided to AND gate 218, the output of which is connected to counter 220. Counter 220 generates an active output signal on its output line 222 the first time TD and VH are found active simultaneously. It generates an active signal on its output line 224 the second time TD and VH are found active simultaneously.

The active signals on lines 222 and 224 condition AND gate assemblies 226 and 228 which cause the P'1 and P'2 values on scanner bus 205 to be loaded into READ POINTER registers 230 and 232, respectively.

Lines 224 and 222 are provided to OR circuit 213, the output of which is inverted through inverter 211. The output of inverter 211 is provided to one input of AND gate 210.

This prevents the P'1 and P'2 values from being sent to the CCU since, at that time, AND gate 210 is not conditioned and no VH tag is send on line 208.

Then, by means of the conventional exchange of TD and VH tags between the CCU and the scanner, the remaining parts A and C of the short frame are sent on scanner bus 205, and to the CCU since AND gate 210 is no more conditioned and the end of chain EOC tag is raised on scanner EOC line 214. Normally this line is part of the CCU bus, but according to the present invention, the bus EOC line 216 is raised by the bypass booster hardware at the end of the complete frame transfer, as will be explained later on.

When EOC line 214 is activated by scanner 2 at the end of the transfer of the information contained in the simulated short frame, latch 204 is set and provides an active signal on line 234 and an inactive signal on line 236. Thus AND gates 210 and 202 are inhibited an no more TD and VH tags are exchanged with scanner 2. At that time the tags are exchanged between the CCU and the bypass booster hardware.

AND gate 238 is conditioned and the TD tag from line 200 is provided at its output 240. Thus AND gate 238 provides an active signal at the next TD tag, which causes address P'1 of the memory 44 to be read and the content of register 230 to be incremented. The data byte which is read from memory 44 is sent to the data lines 206 of the CCU bus through AND gate assembly 242 which is conditioned by the TD tag on line 200 and by the active output signal on line 234 and by AND gate 206. The TD tag is provided to delay circuit 244 which generate a TD delayed pulse which is transmitted to the VH line 208 through AND gate 246 which is conditioned during the duration of the data transfer through the END of DATA TRANSFER signal on line 248 inverted in inverter 250 and by the signal on output line 234 of latch 204.

Upon reception of this simulated VH tag, CCU sends a new TD tag and the following data byte in memory 44 is sent on data lines 206.

The end of data transfer is detected by comparator 252 which detects when the content of register 230 becomes equal to the P'2 value in register 232. Upon detection of this equality an active END of DATA TRANSFER signal is generated on line 248, which is provided to AND gate 254. AND gate 254 is conditioned during the data transfer phase by the signal on line 234. Thus AND gate 234 provides the TD delayed signal from line 245 on the EOC line 216. This indicates to the CCU the end of the data transfer.

Figure 4:
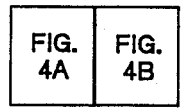
FIG. 4 shows how

The transmit portion of the bypass booster line interface will now be described in reference to FIG. 4.

Figure 5A:
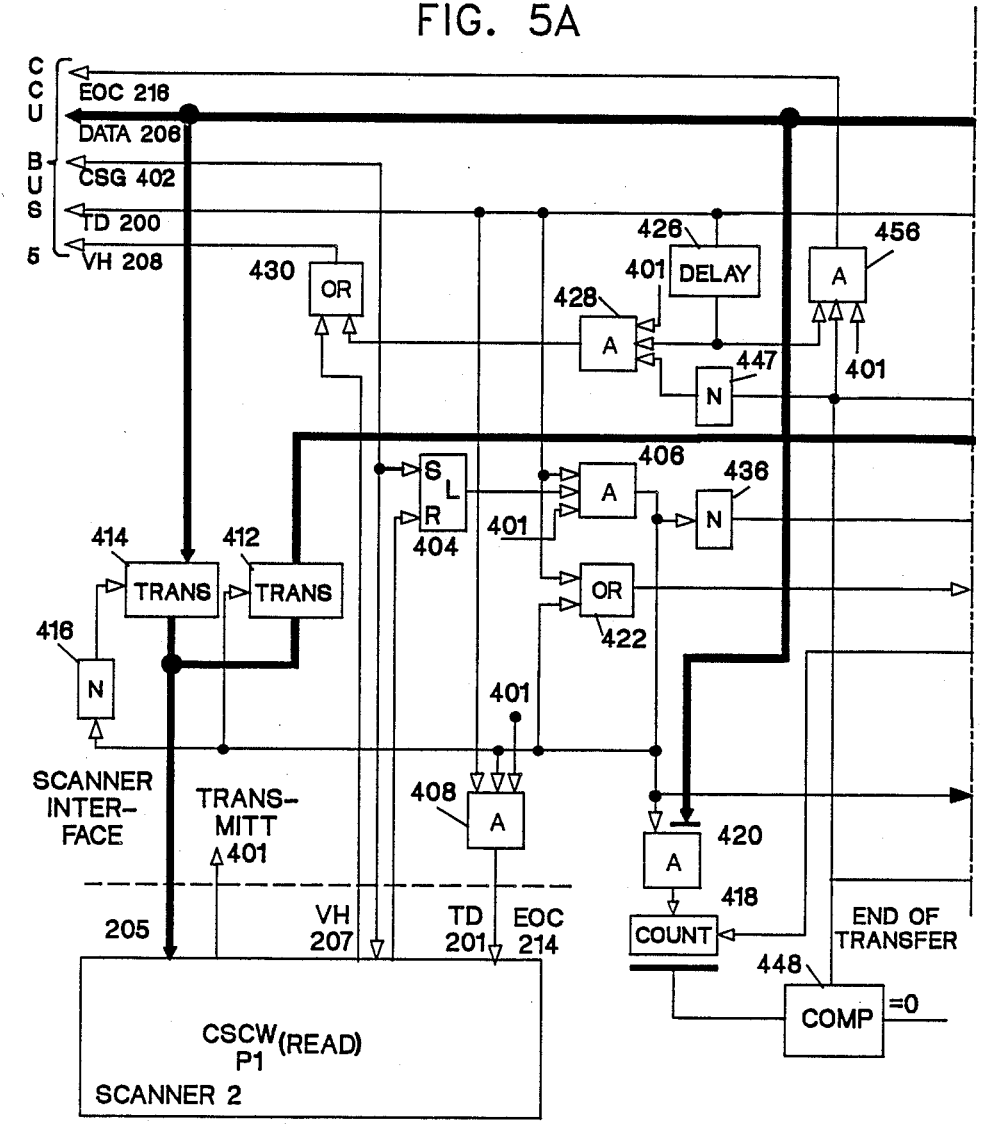
FIGS. 5A and 5B are assembled.
Figure 5B:
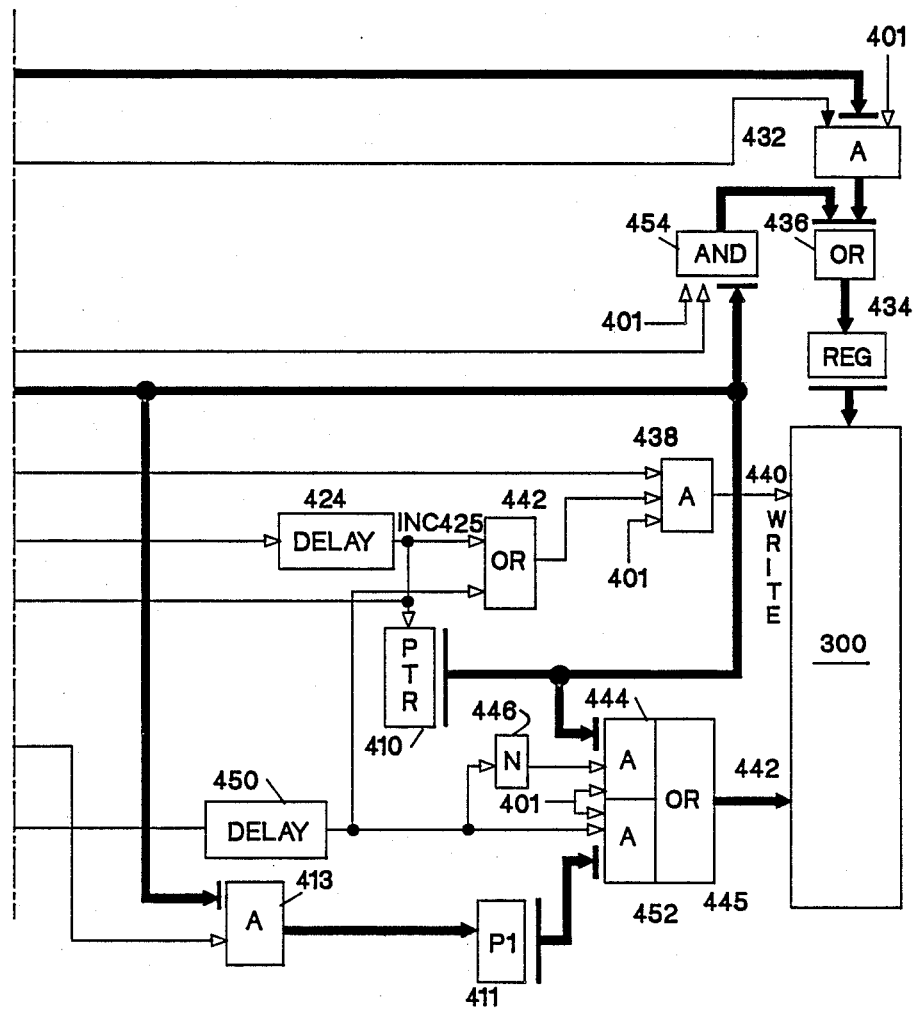

The frames which are to be transmitted on the high speed line 6 are sent to the scanner and to the bypass booster by the central control unit (CCU) through the system bus as will be described later on in reference to FIG. 5.

As will be described in reference to FIG. 5, scanner 2 receives for each frame, the P1 pointer value, indicating the first location in transmit bypass booster memory 300, which is assigned to the frame. The P2 pointer value is stored into the first location at address P1 at will be described later on. It constructs the A and C fields of the frame as usual. The data bytes are sent to memory 200 and stored in locations P1+1 to P2.

In the drawing, receive bypass booster memory 44 and transmit bypass booster memory 300 are shown separately for the sake of clarity, but they may be part of the same memory unit.

The scanner sends on its interface line 3, using its normal way of operation, the P1 value and then the A and C fields.

This short simulated frame delimited by flags is provided to flag detection circuit 302 and to zero deletion circuit 304. The simulated frame after zero deletion in circuit 304 is provided to NO FLAG BYTE counter 306 which is reset upon detection of a flag, by the active signal on output line 308 of flag detection circuit 302.

Counter 306 generates active signals on line 311 at the end of the first byte, on line 312 at the end of the second byte and on line 313 at the end of the third byte.

The bit stream on interface line 3 after zero deletion is provided to serializer/ deserializer (serdes) 316 which operates at the v clock speed and provides on its output bus 318 assembled information bytes.

Bus 318 is provided to AND gate assemblies 320, 322 and 324 which are conditioned by the active signals on line 311, 312 and 313, respectively, to transfer at their output busses the P1 value and A and C fields.

Thus, when the signal on line 311 becomes active, the P1 value contained in serdes 316 is provided to P1 READ POINTER register 326 through AND gate 320 and a read control signal is generated on line 330 through OR gate 328. The location at address P1 in memory 300 is read so that the P2 value is provided on memory output bus 332 to AND gate assembly 334. AND gate assembly 334 is conditioned by the signal on line 311 and the P2 value is transferred through AND gate 334 into P2 register 336.

When signals on lines 312 and 313 are active, AND gate 338 which is conditioned by the FLAG END signal on line 340, provides the active signal at the output of OR gate 342 to the set input of latch 344. Thus, latch 344 provides an active SEND BURST output signal on line 345 to control the sending of fields A and C on the high speed line 6. The SEND BURST signal conditions AND gate 346 which causes the HS clock on line 12 to be provided to serdes 348. The A and C fields are transferred from serdes 316 into serdes 348 through AND gate assemblies 324 and 326 and the bit stream which is shifted out serdes 348 is provided to one input of AND gate 350 which is conditioned by the SEND BURST signal on line 345.

Thus the bit stream comprising the A and C fields is provided to zero insertion circuit 352 through OR gate 354.

At that time AND gate 355 is conditioned by the output signal of OR gate 356, one input of which is connected to line 345, and the bit stream comprising the A and C fields with inserted zeroes is provided on high speed line 6 through OR gate 359.

Then a flag is provided on interface line 3 by scanner 2. The SEND BURST signal on line 345 and the active signal at the output of circuit 302, which are provided to AND gate 358, cause an active signal to be provided by AND gate 358 to set latch 360 and reset latch 344. Latch 360 provides on its DATA SEND output line 361, a signal which is active and conditions AND gate 362 and AND gate 364. Thus, AND gate 362 provides the HS clock signal from line 12 to one input of OR gate 328. At each HS clock pulse during the DATA SEND period, a read control signal is provided at memory 300 and the content of register 326 is incremented. The data bytes contained in the frame to be sent on high speed line 6 are sequentially read and provided to serializer/ deserializer 366 and outputted at the HS clock speed on line 368 which is connected to AND gate 364. AND gate 364 provides the data bits, through OR gate 354 to zero insertion circuit 352. The bit stream comprising the data bytes with inserted zeroes is provided on high speed line 6 through AND gate 355 which is conditioned through the active signal at the output of OR gate 356 and through OR gate 359. The content of P1 register is compared with the P2 value by comparator 370 which generates on its output line 371 a signal which is active when an equality is detected, i.e. at the end of the data sending period. This signal is the START CRC PHASE signal which causes the two CRC bytes to be sent on line 6.

This signal on line 371 resets latch 360 so that the DATA SEND signal becomes inactive and sets latch 372 which provides the CRC PHASE active signal on line 373.

The bit stream at the output of OR gate 354 is provided to the CRC accumulator 374, which calculates the CRC bytes. The CRC bytes are provided to one input of AND gate 376 which is conditioned by the CRC PHASE signal on line 373. The CRC bytes are provided to the zero insertion circuit 352 to be sent on high speed line 6 through AND gate 355 and OR gate 359. AND gate 355 is conditioned by the active output signal of OR gate 356 which has one input line connected to line 373.

The START CRC PHASE signal on line 371 resets byte counter 378 which provides an active signal on its output line 379 when it counts two bytes. This signal is thus active at the end of the CRC sending period and causes latch 372 to be reset.

When SEND BURST, SEND DATA and CRC PHASE signals are inactive, OR gate 356 provides an inactive signal so that AND gate 355 is no more conditioned. At that time an active signal is provided at the output of inverter 380 which conditions AND gate 382 so that flag bits are shifted out register 385 and sent on high speed line 6. An active flag end signal is provided on line 340 each time the eight flag bits are sent.

This active signal conditions AND gate 338 to start sending of a new frame when signals on lines 311, 312 and 313 become active.

Latch 385 is reset by the DATA SEND signal on line 361 and set by the RESET CRC PHASE signal on line 379. The output signal of latch 384 conditions AND gate 386 so that the v clock signal is not provided to scanner 2 during the data sending period.

The transmit part of the bypass booster on the system bus side will now be described in reference to FIG. 5.

When a transmit command is initiated by the scanner microcode, the scanner initiates a cycle steal operation and constructs a cycle steal control word CSCW which contains the read command indicating that the transfer of data is to be performed from the central control unit to the scanner. An active signal is provided on line 401 which conditions all the AND gates in the transmit part of the bypass booster shown in FIG. 5.

During the set mode, the scanner is initialized with a byte count equal to one.

To initiate the cycle steal operation, the scanner sends a cycle steal request to the CCU which answers with a cycle steal grant signal on line 402. This signal sets latch 404. Then at the first TD tag which is sent by the central control unit on line 200, AND gate 406 provides an active TD tag which is provided to the TD scanner line 201 through AND gate 408.

At that time, the current write pointer value of memory 300 which is contained in register 410 is gated through transmitter/receiver circuit 412 which is conditioned by the active output signal from AND gate 406, to be provided to the scanner as if it were received from the central control unit. This current value is equal to P1 pointer corresponding to the frame which is sent by the CCU. This value is loaded into P1 WRITE POINTER register 411 through AND gate assembly 413 which is conditioned by the active output signal of circuit 406.

The signal at the output of AND gate 406 is inverted through inverter 416. Thus transmitter/receiver 414 is not conditioned and the data on system bus lines 206 are not provided to the scanner. The central control unit sends the byte count of data which will be sent to the memory 300. This count is loaded into counter 418 through AND gate assembly 420 which is conditioned by the active signal at the output of AND gate 406. Transmitter/receiver 414 is not conditioned during the time duration of the short frame exchange so the data on bus lines 206 will not be received by the scanner since the tags will not be provided to the scanner tag line.

The active signal at the output of AND gate 406 is provided through OR gate 422 to delay circuit 424 which provides on its output line 425 a TD delayed signal which causes current pointer register 410 to be incremented.

Tag TD on line 200 is delayed in circuit 426 which provides on its output line a TD delayed tag. This tag is provided to AND gate 428 which is conditioned during the data transfer by the active signal at the output of inverter 445. Inverter 447 inverts the END OF DATA TRANSFER signal of line 444.

As usual, scanner 2 constructs the A and C fields, to be sent to interface line 3. Since the scanner is initialized to receive only one byte upon reception of P1 from register 410, it raises its EOC (END OF CHAIN) line 214. This resets latch 404 and transmitter/receiver 412 is no more conditioned. The scanner EOC tag is not sent to the CCU, which upon reception of the VH tag from OR circuit 430, sends a new TD tag on line 200 and a data byte on bus lines 206. The TD tag conditions AND gate assembly 432 which transfers the data byte into memory input register 434 though OR gate assembly 436.

The output signal of AND gate 406 is inverted in inverter 436 which provides at that time, an active signal so that AND gate 438 is conditioned and causes a write control signal to be provided on its output line 440 through circuit 424 and OR circuit 442.

The memory address at which the input register content will be written is provided on bus 442 from register 410 through AND gate 444 which is conditioned by the active output signal of inverter 446. Inverter 446 provides an active signal during the data transfer period. Thus at each TD delayed pulse at the output of circuit 424, a write control pulse is provided on line 440, pointer register 442 is incremented and the memory address is provided on bus 442. Thus at each TD a new byte is written into memory 300 and a VH tag is provided on line 208 through OR gate 430.

At each byte transfer in memory 300, counter 418 is decremented by one through the active signal on output line 425 of circuit 424. The counter content is compared with "zero" by comparator 448 which provides the active END OF DATA TRANSFER signal on its output line 444 when the byte count of the frame has been stored into memory 300.

The signal on line 444 is delayed by circuit 450 and the delayed signal conditions AND gate 452 which transfers the P1 value in register 411 to the address bus 442 through OR gate assembly 445. The current pointer value in register 410 which at that time is equal to P2, is transferred by AND gate assembly 454 which is conditioned by the active signal on line 444, to memory input register 434 through OR gate assembly 436. Thus the P2 value is written at address P1.

The active END of DATA TRANSFER signal on line 444 conditions AND gate 456 which provides the active EOC tag on line 216.

We claim:

1. An improved Receive mechanism to be used in a communication controller comprising a central control unit connected to at least one line scanner (2) having a speed of operation v through a bus (5), wherein the line scanner may not be attached through its interface line (3), to communication lines working at a speed higher than v, said mechanism allowing the scanner to be connected to one communication line (6) onto which information is transported in frames at a high speed HS which is higher than v, and being characterized in that it comprises:
    line interface receive means comprising:
        receiving means (22,34,36,40) for receiving the frames of a frame bit stream at the line speed HS,
        receive storing means (44), into which the frame bytes received from the receiving means are stored at addresses delimited by first and second write pointers, saved in first and second write register means (46,48);
    means responsive to the received frames on the high speed line for constructing short frames therefrom, said short frames comprising a fixed number of frame bytes and the first and second write pointer values indicating where the frame bytes are stored in the receive storing means;

means (102,50,52) for sending to the scanner at the scanner speed v on the scanner interface line, the so constructed frames;

bus interface receive means comprising:

means (205,214,207,201) which are responsive to a receive command from the central control unit for outputting the short constructed frames from the scanner and sending the fixed number of the frame bytes to the central control unit through the bus, means (210,211,213) which prevent the write pointer values comprised in the short frames and which are outputted from the scanner from being sent to the central control unit;

means (218,220,226,228) for providing said write pointer values to first and second read register means (230,232);

means (204,238,242,246) for sequentially reading the receive storing means content at the addresses defined by the first and second read pointer register means content and sending the frame bytes exceeding the fixed number of bytes from the receive storing means to the central control unit.

2. The receive mechanism according to claim 1, characterized in that:

the receiving means comprises a frame check circuit (36) which is responsive to the frame bit stream received from the high speed line for generating error status signals indicating whether the frames have been correctly received or not, the means for constructing the short frames comprises an error code calculating means (88) for calculating error code bytes of the short frames and gating means (144,142) which are responsive to the error status signals for sending the error code bytes in the short frames if the status signals indicate that the complete frames were correctly received or inverted error code bytes if the status signals indicate that the complete frames were erroneously received.

3. The receive mechanism according to claim 2, characterized in that the means for constructing the short frames comprises:

deserializing means into which the bit stream received from the high speed line is assembled into bytes;

first in-first out FIFO storing means (14);

FIFO loading means (18) which is responsive to the received frame bit stream, for generating a loading control signal which is active from the beginning of each received frame until the fixed number of bytes is received, said loading control signal, when active, causing the bytes assembled by the deserializing means to be loaded into the FIFO storing means; and gating means (50,52) which gates successively on the scanner line interface, for each received frame, the bytes which are outputted from the FIFO storing means, the content of the first and second write pointer registers means (46,48) and the error code bytes or inverted error code bytes as the case may be.

4. An improved transmit mechanism to be used in a communication controller comprising a central control unit connected to at least one line scanner through a bus, wherein the line scanner may not be attached through its interface line to communication lines working at a speed higher than v, where v is the maximum speed of the scanner, said mechanism allowing the scanner to be connected to one communication line onto which information is transported in frames at a high speed HS which is higher than v, and being characterized in that it comprises:

bus interface transmit means comprising:

means (401,402,404,406) for initiating a transmit operation from the central control unit;

transmit storing means (300) into which the frame bytes which are sent from the central control unit to be transmitted on the high speed line as a frame bit stream are stored into positions delimited by first and second write pointers, the address of the last position into which a byte has been stored, being stored into a current pointer register means (410);

means for simulating the transmission to the line scanner through its bus interface, of a short frame comprising at least the first pointer value which is equal to the content of the current pointer register means (410) when the transmit operation is initiated;

means (418) for receiving from the central control unit when the transmit operation is initiated, the count of frame bytes which are to be sent on the high speed line;

line interface transmit means comprising:

transmitting means which are responsive to the short simulated frames which are sent on the scanner line interface (3) to cause, at the beginning of each frame, the first pointer value of the simulated short frame to be loaded into a first read pointer register means (326), which provides on its output bus the transmit storing means address, means (306,360,370,362,366,355,359) which cause the read pointer register means content to be incremented and a read control signal to be provided to the transmit storing means so as to read sequentially at the high speed, the frame bytes from the transmit storing means at the address defined by the read pointer register means (326) until the byte count is reached, and to transmit them serially on the high speed line.

5. A transmit mechanism according to claim 4, characterized in that the bus interface transmit means comprises:

counter means (418) into which the byte count which is sent from the central control unit at the beginning of the transmit operation is stored and the content of which is decremented each time a frame byte is written into the transmit storing means;

means (448) for detecting that the content of the counting means has reached zero and providing on its output a signal which is active at the end of transfer of the frame bytes into the transmit storing means, said signal being transmitted to the central control unit to signal the end of the transmit operation.

6. A transmit mechanism according to claim 5 characterized in that the bus interface transmit means comprises:

means (452,454) which are responsive to the end of transfer active signal to cause the current pointer value, which is at that time equal to the second pointer value, to be written into the transmit storing means at the address equal to the first pointer value.

7. A transmit mechanism according to claim 6 characterized in that the line interface transmit means comprises:

means (334), which are responsive to the byte which is read from the transmit storing means when the first pointer value which is sent in the simulated short frame is loaded into the first read pointer register means (326) to cause the byte which is equal to the second pointer value to be loaded into second read pointer value register means (336);

comparing means (370) which compares the contents of the first and second read pointer register means to generate an active signal which causes the incrementation of the first read pointer register means to be stopped and the read operation of the storing means to be stopped.

8. A transmit mechanism according to claim 7, characterized in that the line interface transmit means comprises:

means (366) for serializing the data bytes which are read from the transmit storing means which provide on their output line (368)(the frame bit stream) to be transmitted on the high speed line;

means (374) which is responsive to the bit stream on said output line to calculate the error code bytes corresponding to the frame to be transmitted; and means (374,376) which are responsive to the active signal provided by the comparing means for causing the error code bytes to be sent on the high speed line after the frame bytes read from the transmit storing means.

9. A transmit mechanism according to any one of claims 4 to 8 characterized in that the line interface transmit means comprises means (340,380) for sending delimiting flags once a complete frame has been sent on the high speed line.

10. A system to be used in a communication controller, comprising a central control unit connected to at least one line adapter through a bus, wherein the line adapter may not be attached through its line interface, to communication lines working at a speed higher than v, said mechanism allowing the adapter to be connected to one communication line onto which information is transported in frames at a high speed HS which is higher than v, said system comprising the receive mechanism according to any one of claims 1 to 3 and the transmit mechanism according to any one of claims 4 to 9.

* * * * *